Palser & Howland. Sheet 1, 2 Sheets.

Pulp Digester.

No. 2,731. Reissued Aug. 13, 1867.

Inventors;
Joseph R. Palzer
Gardner Howland
by their atty C. S. Renwick

N. PETERS, PHOTO-LITHOGRAPHER, WASHINGTON, D. C.

Palser & Howland. Sheet 2, 2 Sheets.

Pulp Digester.

No. 2,731. Reissued Aug. 13, 1867.

Witnesses
Andrew Anderson
[illegible]

Inventors;
Joseph B. Palser
Gardner Howland
by their att. C. F. Renwick

N. PETERS, PHOTO-LITHOGRAPHER, WASHINGTON, D. C.

UNITED STATES PATENT OFFICE.

JOSEPH B. PALSER AND GARDNER HOWLAND, OF FORT EDWARD, N. Y.

IMPROVEMENT IN THE MANUFACTURE OF PAPER-PULP.

Specification forming part of Letters Patent No. 24,484, dated June 21, 1859; reissue No. 997, dated July 3, 1860; reissue No. 2,731, dated August 13, 1867.

*To all whom it may concern:*

Be it known that we, JOSEPH B. PALSER and GARDNER HOWLAND, of Fort Edward, Washington county, New York State, have invented certain new and useful Improvements in the Manufacture of Paper-Pulp from straw and other fibrous substances; and we hereby declare that the following is a full and exact description thereof, reference being had to the accompanying drawings, making a part of this specification, in which—

Figure 1:
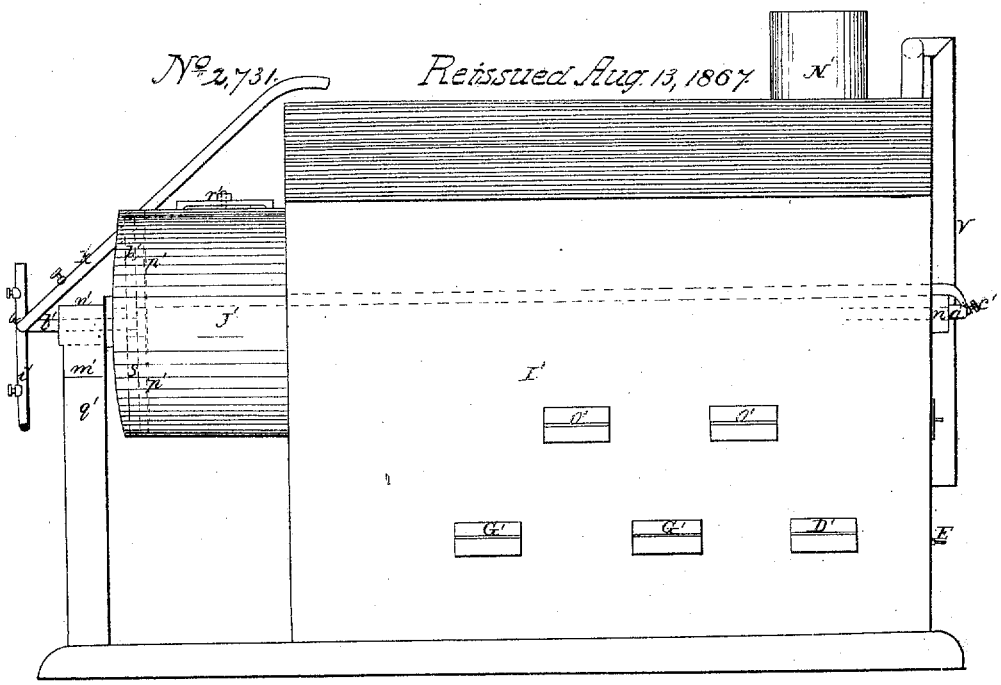
Figure 3:
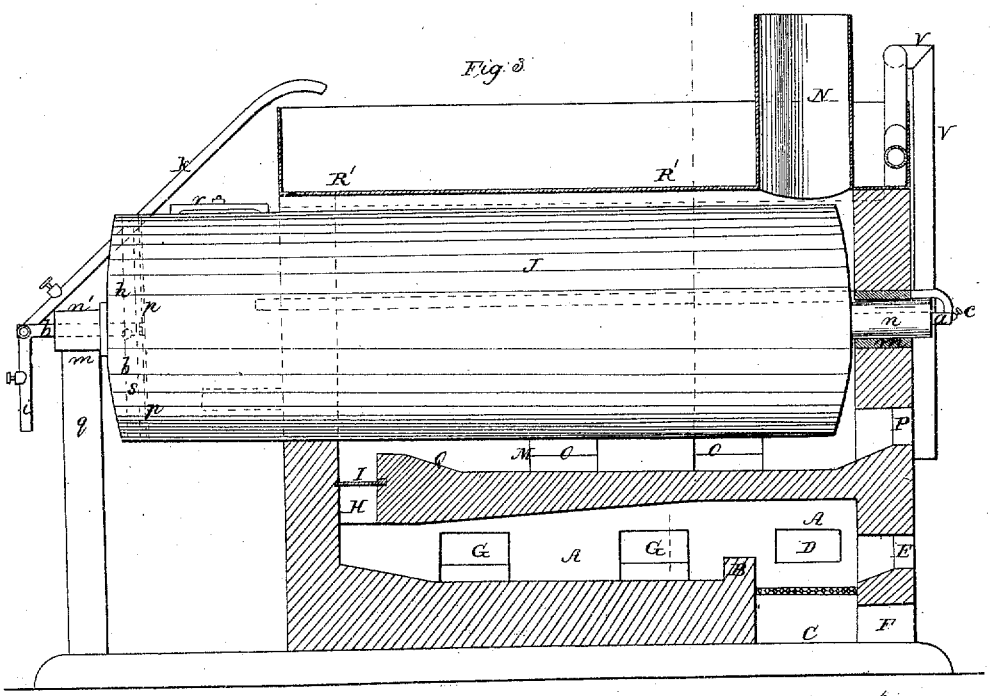
Figure 2:
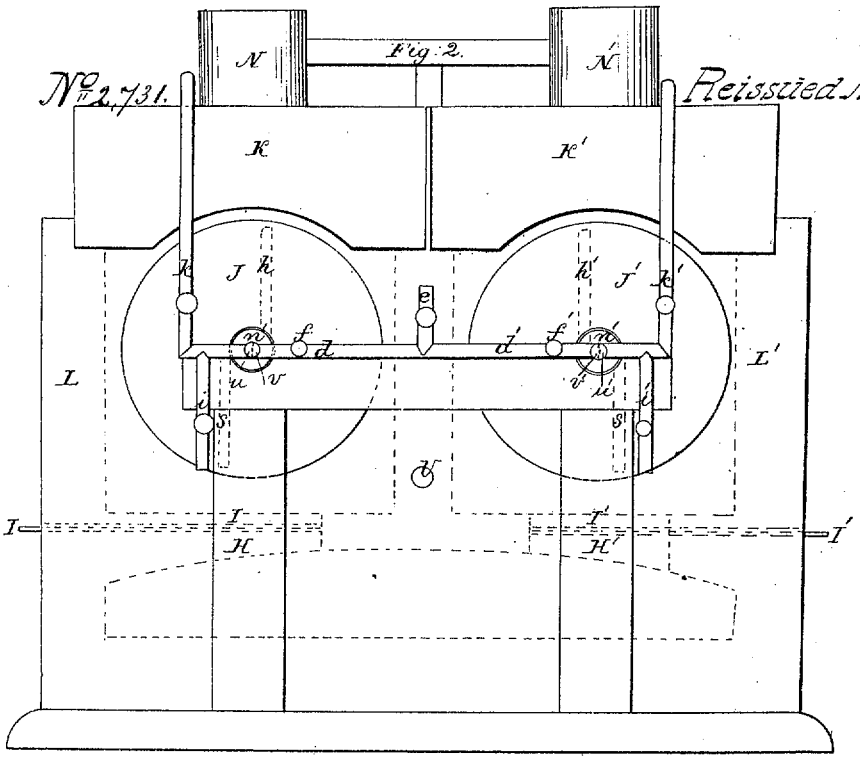
Figure 4:
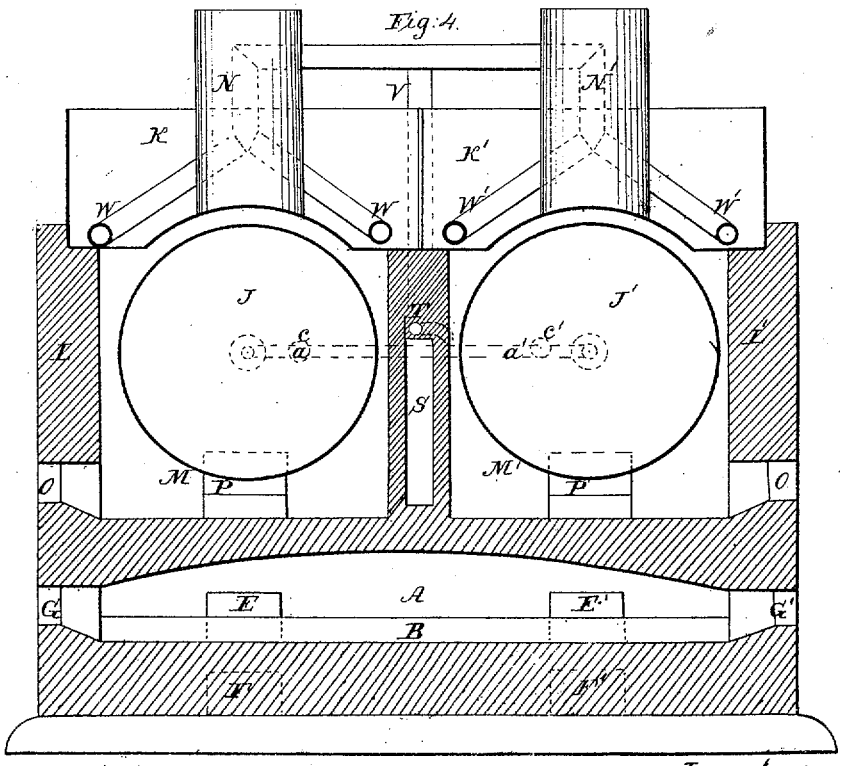

Figure 1 is a side view. Fig. 2 is an end view. Fig. 3 is a longitudinal section; Fig. 4, a transverse section.

Similar letters of reference indicate corresponding parts in the several figures.

Our apparatus consists of a reverberatory furnace, upon which stand side by side two rotary boilers, each inclosed in a separate envelope over and around each boiler.

To enable others skilled in the art to make and use our invention, we will proceed to describe its construction and operation.

In the accompanying drawing, A A is the reverberatory furnace. B is the fire-bridge; C, the fire-place; D D′ and E E′, the fire-doors; F F′, draft-openings; G G and G′ G′, doors to the reverberatory furnace; and H′ H′ are two passages, which may be closed by the sliding valves I I′. J J are two rotary boilers; K K′, two iron vats above the boilers. L L and L′ L′ are brick, which inclose the boilers and support the vats K K′. M M M′ M′ are spaces between the envelopes and the boilers, forming a flue. N N are chimneys, leading M M M′ M′ into the open air through the vats. O O P and O′ O′ P′ are doors, giving access to the spaces M M M′ M′. Part of the bottoms of vats K K′ are made cylindrical, to encircle the boilers, and form the upper part of the boiler-envelope R R R′ R′. The pipe T leads from a reservoir of water, or other liquid, placed on a higher level than both rotary boilers, and it permits such liquids to be warmed, when needful, in their passage through this pipe. The pipe T T′ is divided into two branch pipes, *a* and *a′*, each of which turns into one of the boilers through stuffing-boxes in the journal, and is provided with a faucet, *c c′*. The pipe T T′ and branches *a a′* are used to fill the boilers with water or other liquids. At the other end of the boilers pipes *b b′* enter therein through journals *n n′*. These pipes are divided lengthwise into two pipes, V V′ and *u u′*, by partitions. (Shown in Fig. 2.) The pipes V V′ are intended for steam, and are united together by a pipe, *d d′*, provided with faucets *f f′*. On the pipe *d d′* is a branch pipe, *e*, on which a safety-valve and a steam-gage may be placed. The pipes *d d′* and *v v′* are united with the upper portions or steam-chambers of the boilers by pipes *h h′*, also with liquid portions by *u* and *s*. The pipes *u u* are used to empty the boilers from liquids. These pipes extend to the lowest parts of the boilers by pipes *s s′*, and the liquids which are forced out through them may be sent into the vats K K through *k k*, or may be discharged into the gutter through pipes *i i′*. The pipes *h h′* and *s s′* are separated from the stock in the boiler by the perforated partitions *p p p′ p′*, and thus they cannot be broken, or even bent, by the pressure of the revolving stock; nor can they be closed by solid matters accidentally forced into them. The partitions *p p′* serve also as a strainer, to retain the stock in its own apartment, and yet permit the drawing off of all the liquid matters at any desirable time during the operation of the process of boiling.

The described arrangement of perforated partitions and pipes may be varied in several ways substantially the same.

Having thus described our improvement, we will proceed to specify our claims, for which we ask Letters Patent.

We claim—

1. An internal division of the pipe *b*, which passes through the hollow journal of the rotary boilers by means of a partition, so that the steam from the upper portion of the boiler may find exit through one compartment of the pipe, and the liquid contents of the boiler may find an exit through the other compartment thereof, in the manner and for the purpose described.

2. The employment of the perforated diaphragm *p p′* when arranged substantially as described, to protect the pipes *h h′ s s*, and to strain the liquid from the stock, as and for the purposes above described.

GARDNER HOWLAND.
J. B. PALSER.

In presence of—
JOEL TIFFANY,
EDWARD WADE.